June 12, 1962 G. E. HALL 3,038,286
GANG MOWER WITH RETRACTABLE MOWER ELEMENTS
Filed Oct. 16, 1959 2 Sheets-Sheet 1

INVENTOR.
George E. Hall,
BY Parker & Carter
Attorneys.

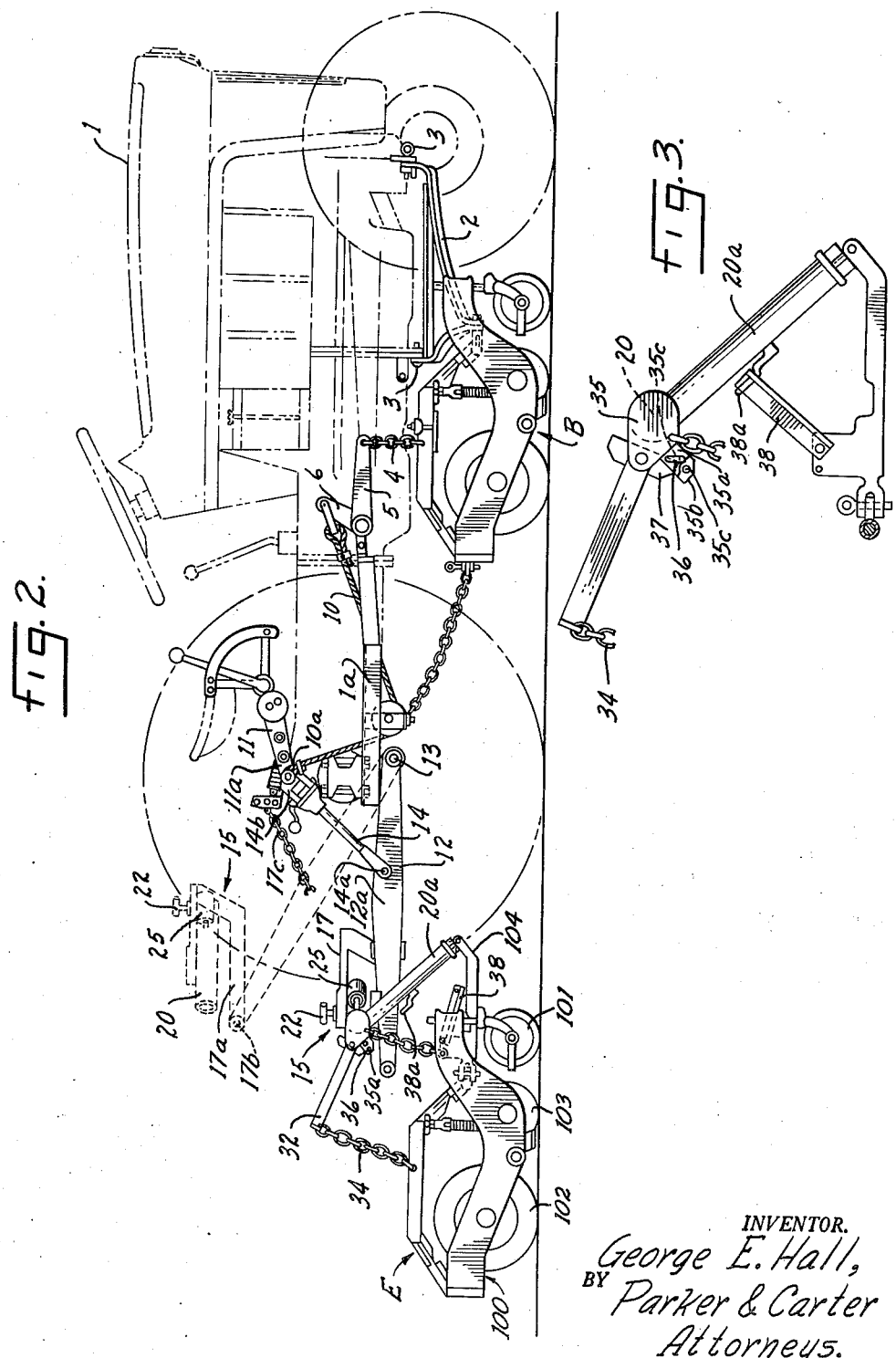

United States Patent Office 3,038,286
Patented June 12, 1962

3,038,286
GANG MOWER WITH RETRACTABLE MOWER ELEMENTS
George E. Hall, Des Plaines, Ill., assignor to Roseman Mower Corporation, Evanston, Ill., a corporation of Illinois
Filed Oct. 16, 1959, Ser. No. 848,174
3 Claims. (Cl. 56—7)

This invention relates to mowers, and particularly to gang-type mowers.

One purpose of the invention is to provide a gang mower having liftable mower elements.

Another purpose is to provide a gang mower assembly which may be installed on vehicles such as tractors and the like.

Another purpose is to provide a gang mower assembly having a plurality of mower elements mountable upon a vehicle for mowing overlapping paths, the mower elements being liftable for transport purposes.

Another purpose is to provide a gang mower having a plurality of elements arranged for mounting upon a vehicle, said elements being liftable and the outer of said elements being inwardly retractable for transport upon and with said vehicle.

Another purpose is to provide a gang mower having a plurality of mowing elements arranged to mow a path wider than the vehicle upon which said elements are mounted.

Another purpose is to provide a gang mower having a plurality of mowing elements arrangeable to mow a path greater than 8 feet in width and selectively arrangeable in a configuration having a maximum overall width of 8 feet for transport purposes.

Other purposes will appear from time to time during the course of the specification and claims.

I illustrate my invention more or less diagrammatically in the accompanying drawings, wherein:

FIGURE 2 is a side elevation illustrating the right-hand (considered from the tractor driver's view) portion of the invention;

FIGURE 3 is a detail enlarged view with elements in raised position and illustrating the means for locking the mower elements in raised position.

Like parts are indicated by like numerals throughout the specification and drawings.

Figure 1:
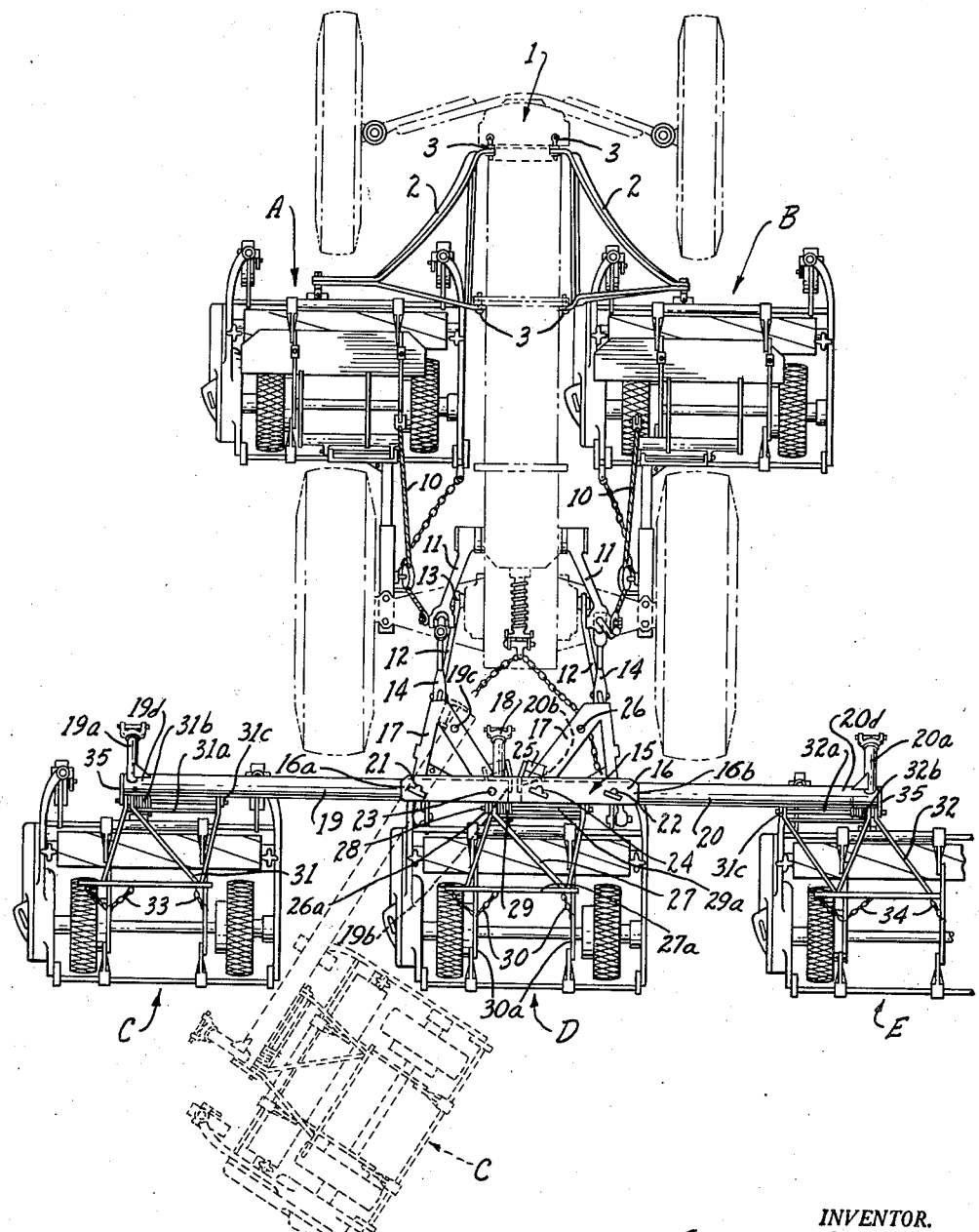
FIGURE 1 is a fragmentary top plan view illustrating in full lines the mowers and supporting and raising mechanism associated therewith, in dotted lines one of the outrigger mowers in transport position and in broken lines portions of a tractor in connection with which the invention may be supported.

Referring now to the drawings, it will be observed that a vehicle, such as a tractor illustrated diagrammatically at 1, may be employed to support a plurality of mowing elements indicated generally by the letters A, B, C, D, and E. The mowing elements A through E do not of themselves constitute portions of the invention, being of generally conventional construction. It will also be observed that the mowing elements are substantially identical one with the other, consequently a broad description of one will suffice. Each comprises a supporting frame 100, forward and rear supporting wheels 101 and 102 rotatably mounted on axles carried by the frame, and a cutter bar 103 positioned between the forward and rear wheels.

The mowing elements A, B are mounted in lateral alignment between the front and rear wheels of the tractor 1. The mowing elements A, B are each supported upon one of the outwardly directed brackets 2 which are pivotally supported on the tractor body, as at 3.

A flexible lift chain 4 is substantially centrally connected to an upper portion of the frames of the respective mower elements A, B. Each of the chains 4 has its opposite end connected to an arm 5 pivotally supported on the tractor 1. Crank arms 6 are suitably, operatively connected to the arms 5 and extend angularly in relation thereto.

A cable 10 is connected by conventional means such as rope clamps to each of the crank arms 6 and has its opposite end 10a connected in like manner to a lift arm 11. It will be understood that suitable hydraulic power mechanism (not shown) is provided for rotating the arm 11 to cause retraction of the arm 6 and a consequent rotation of the arm 5 and resulting lifting, through the medium of chains 4, of the mower elements A, B.

A pair of rearwardly diverging draft arms 12 each has its forward end pivoted as at 13 to the frame 1a of tractor 1. A link 14 is pivotally connected to each of the arms 12 at a point 14a intermediate the ends thereof, and each of the links 14 has its opposite end 14b connected to the end 11a of arm 11 to provide for lifting of the rear portions 12a of arms 12 in response to rotation of the arms 11 transmitted through links 14 to rotate arms 12 about points 13.

A mower-supporting frame is indicated generally by the numeral 15. Frame 15 includes a laterally disposed channel member 16 having its open side facing the tractor 1. Extending forwardly from the channel member in diverging relationship and lying in the same horizontal plane as the upper flange of the channel are guide arms 17. The free ends of the guide arms 17 carry, rigidly fixed thereto, downwardly and rearwardly extending frame members 17a which are pivotally secured, as at 17b, to corresponding draft arms 12. This is best seen in dotted line relationship in FIGURE 2. To maintain the frame 15 in a generally horizontal relationship relative to the ground when the lift arms are raised, a chain of suitable length, such as chain 17c, connected between the tractor and the frame at a point above the connection 17b might be utilized, or suitably arranged stops could also be used, the maintenance of such a relationship being conventional. Thus a main frame may be considered as including members 12, 15, 16, 17, 17b and is pivotally supported on and solely supported by the tractor 1, there being no ground-contacting wheels on the main frame. The arms 12 pivotally carry the mower support frame formed of elements 15, 16, 17 and 17b. A drag arm 18 extends forwardly and downwardly from the frame channel member 16 and is suitably pivotally connected to a forwardly extending portion 104 of the frame forming part of mower element D.

Outwardly extending from beneath the opposite ends 16a, 16b of frame portion 16, and forming, in effect, a part of the mower support frame indicated generally by numeral 15, are external or outrigger hanger tubes or supporting arms 19, 20. The arms 19, 20 are pivotally supported between the flanges (not shown) of channel 16 adjacent the outer ends thereof, as indicated at 21, 22, respectively. The inner ends 19b, 20b of the arms 19, 20 lie beneath spaced apertures 23 positioned intermeditae the ends 16a, 16b of channel member 16. The inner ends 19b, 20b of arms 19, 20 are apertured as indicated at 19c, the arms 20 carrying a similar aperture (not shown) to provide a set of aligned apertures with the apertures 23 in member 16 and pins 24 are removably inserted in each set of apertures to retain the arms 19, 20 in alignment with the longitudinal extension of the channel member. Roller members 25 are mounted, one each on the inner ends 19b, 20b of the arms 19, 20, for rolling contact with the under surface of guide arms 17. Apertures 26 are formed in the arms 17, one each adjacent the outer ends thereof, to removably receive the pins 24 when the apertures in the inner ends 19b, 20b of arms 19, 20 are positioned therebeneath.

A Z-frame 27 is pivotally mounted on brackets 26a which are in turn secured to the channel member 16. A rod 28 extends between the brackets 26a and the Z-frame 27 is pivoted to the rod 28. A coiled torsion spring 29 surrounds a portion of rod 28 and has its opposite ends engaging member 16 and Z-frame 27 to urge the Z-frame 27 into an upwardly, rearwardly inclined position. The spring 29 may engage members 16 and 27 in any suitable manner well known to those skilled in the art and no specific illustration thereof is therefore shown, the manner of such engagement forming no part of the invention herein. Supporting elements comprising the flexible chains 30 extend from the outer upper end 27a of the Z-frame 27 downwardly to and are connected to an upper portion 30a of the frame of mower element D. They also tend to maintain lateral stability of the corresponding mowers relative to the channel member 16.

Rearwardly and upwardly inclined from the outer ends 19d, 20d of arms 19, 20 are Z-frame members 31, 32, respectively. The Z-frames 31, 32 are substantially identical with the frame 27. The frames 31, 32 are pivotally supported at their inner ends on rods 31a, 32a carried between brackets 31c and end plates 35, and springs 31b, 32b are effective to urge the frames 31, 32 upwardly, the said springs surrounding portions of rods 31a, 32a and having their opposite ends engaging arms 19, 20 and frames 31, 32 in any suitable manner as above described in relation to members 16 and 27. Flexible supporting chains 33, 34 extend from the Z-frames 31, 32, respectively, downwardly to and are connected to the upper portions of the frames of mower elements C, E respectively.

The outer ends 19d, 20d of arms 19, 20, each carry an end plate 35. Each end plate 35 has depending therefrom a pair of downwardly inclined parallel plates 35a, 35b, plate 35a being partly broken away in FIGURE 3 to expose a part of plate 35b and to illustrate their parallelism. Each set of plates 35a, 35b carries an upper and lower pair of aligned apertures 35c, the apertures of each plate being aligned. A pin 36 is normally carried inserted in the lower pair of aligned apertures in the plates 35a, 35b to bridge the space therebetween. The outer side arm members of the Z-frames 31, 32 have a shoulder 37 at their inner ends adjacent their pivot point on rods 31a, 32a, the shoulder 37 being positioned for passage between the plates 35a, 35b in a path intersecting a line extending between the upper set of aligned apertures in the plates 35a, 35b.

Extending in a forwardly, downwardly inclined plane from each of the outer ends of the arms 19, 20, is a drag arm, the arms being indicated at 19a, 20a, to which a forwardly extending portion 104 of the frames of mowing elements C, E, respectively, are pivotally connected.

Each of the drag arms pivotally connected to a forward portion of the frames of mowing elements C, D and E forms with that frame portion a type of scissors device permitting the elements C, D and E to follow the contour of the ground in mowing operation. A tie-plate 38 is pivotally carried upon the forward frame beneath the drag arm and a hook 38a is carried on an under surface of the drag arm, the tie plate 38 having an aperture to receive hook 38a and being of a length such as to hold such scissors device in substantially closed position.

Whereas I have described and illustrated a practical and operative device, nevertheless, many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

The operator, desiring to transport the gang mower of the invention without employing the mowing action thereof, simply actuates the hydraulic mechanism effective to rotate the arm 11, in a clockwise direction as the parts are illustrated in FIGURE 1. By means of cable 10 and link 14, rotation of the arm 11 raises all of the mowing elements A through E, the cable 10 actuating arms 5 to lift elements A, B through the medium of chains 4, the link 14 being effective to rotate draft arms 12 and with them frame 15 and external hanger tubes or arms 19, 20.

When the operator desires to transport the mowing elements of the invention on the highway where a legal width is limited to 8 feet, the operator first removes pins 36 from the outer apertures in the plates 35a, 35b and inserts the pins 36 in the inner apertures in said parallel plates 35a, 35b, thus insuring that the Z-frames 31, 32 remain at their maximum upper positions, the shoulders 37 on said frames being held by the pins 36.

The operator may also raise tie plates 38 on each of outer mowing elements C and E and engages them with hooks 38a, thus locking the elements C and E against pivotal movement on the associated drag arms 19a, 18 and 20a, respectively.

The operator then actuates arm 11 to raise it. Raising of arm 11 causes the entire supporting structure for the mowing elements C, D and E to be raised. The Z-frame 27 is not held in its uppermost position and is permitted to move downwardly in relation to the frame member 16 as the frame member 16 is raised. When the maximum downward limit of travel of Z-frame 27 is reached, it then moves upwardly for the remaining upward travel of the frame member 16, producing tension upon chains 30 and finally raising the mower element D a distance sufficient to permit its movement over the ground without contact therewith.

Since the Z-frames 31, 32 were held in their upper positions, raising of the arms 19, 20 caused immediate tensioning of the chains 33, 34, and a consequent raising of mower elements C, E with the arms 19, 20. Thus, the elements C, E are raised to a height substantially greater than that to which mowing element D is raised, whereby said support arms and mower elements C, E may be folded inwardly about the pivots 21, 22 to a position above the center mower element D for legal transportation along a highway, as indicated in dotted lines in FIG. 1.

The operator then removes the pins 24 from apertures 23 and rotates the mowing elements C, E inwardly and rearwardly toward the axis of the vehicle, the rollers 25 being caused to move beneath and in contact with the flat undersurface of the central angularly disposed portions of the guide arms 17. When the mowing elements C, E have reached their maximum inward travel i.e. when they are folded above the center mower element D, the pins 24 are inserted in apertures 26 to retain the elements C, E in their folded or transport position. As best seen in FIGURE 1, the elements C, E are thus rotated into positions within the width defined by the outer edges of mowing elements A, B. Since this width is maintained at a maximum of 8 feet, the entire vehicle, including all of the mowing elements of the invention, is legally transportable on the highway.

When the operator desires again to resume mowing operations, the pins 24 are removed from apertures 26, the mowing elements C, E are rotated back into alignment with each other and with mowing element D, the arms 19, 20 being rotated on their pivots 21, 22, respectively, for this purpose. When the arms 19, 20 are again in alignment with channel member 16, the pins 24 are reinserted in apertures 23 and into the apertures in the inner ends of arms 19, 20. The operator then operates the hydraulic mechanism to rotate the arm 11 toward its original or downward position, thus permitting all of the mowing elements A through E to be lowered into contact with the ground. The operator then removes the pins 36 from the inner sets of apertures in the plates 35a, 35b and places it for storage purposes in the outer sets of apertures therein. The contact with the ground of mowing elements C, E produced a sufficient relaxation of tension upon tie plate 38 to permit its removal from hook 38a, and the operator then returns the plate 38 to storage position at rest upon the forwardly projecting portion of the associated mower frame.

I claim:

1. In combination, a tractor and mower assembly for mowing a path wider than the tractor comprising a tractor, a pair of rearwardly extending draft arms pivotally supported on said tractor, means on said tractor for lifting said draft arms, a mower-supporting frame pivotally carried adjacent the outer rear ends of said draft arms, a central mower element pivotally connected to and carried beneath said supporting frame for floating movement in a vertical plane, a pair of support arms pivotally secured adjacent their inner ends to said supporting frame for limited swinging movement in a generally horizontal plane and normally extending laterally outwardly in opposite directions from said frame and beyond the lateral dimensions of said tractor when mowing a path and swingable inwardly to a transport position, a pair of outrigger mower elements, one of each of said outrigger mower elements being pivotally connected to and carried beneath the outer end of each of said support arms for floating movement in a vertical plane, means for locking the opposite inner ends of said support arms to said supporting frame when said support arms are extending outwardly in said opposite directions from said frame, means for locking said outrigger mower elements in a predetermined vertical position to said support arms and in a higher plane than that occupied by said central mower element whereby said support arms and outrigger mower elements may be swung inwardly with respect to said central mower element to said transport position and means for locking said opposite inner ends of said support arms to said frame when said support arms have been swung inwardly thereon to bring said pair of outrigger mower elements into said transport position substantially inwardly of their normal mowing position whereby the tractor and mower assembly may move along a path substantially narrower than the width of the normal mowing path.

2. A tractor and mower assembly as defined in claim 1 including means for limiting the downward movement of the central mower element relative to said supporting frame whereby when said outrigger mower elements are locked in said predetermined vertical position on said support arms and said mower supporting frame is lifted by said draft arms said central mower element will move downwardly relative to said mower supporting frame to a lower limit position while said outrigger mower elements move upwardly as a unit with said support arms and said mower supporting frame.

3. A tractor and mower assembly as defined in claim 1 including a front mower element pivotally connected to each side of the tractor between the front and rear wheels thereof for movement in a vertical plane and means connecting said front mower elements to said means for lifting the draft arms whereby the front mower elements are lifted simultaneously with said mower supporting frame.

References Cited in the file of this patent

UNITED STATES PATENTS

| | | |
|---|---|---|
| 2,139,200 | Moyer | Dec. 6, 1938 |
| 2,285,306 | Roseman | June 2, 1942 |
| 2,377,380 | Sawtelle et al. | June 5, 1945 |
| 2,659,190 | Imbt | Nov. 17, 1953 |
| 2,672,000 | Speiser | Mar. 16, 1954 |
| 2,901,268 | Christensen | Aug. 25, 1959 |
| 2,909,882 | Lewis | Oct. 27, 1959 |
| 2,936,561 | Grimes | May 17, 1960 |